United States Patent [19]

Sweet et al.

[11] 4,335,991
[45] Jun. 22, 1982

[54] MOBILE TRANSPORT FOR FLUID CARGO

[75] Inventors: Philip J. Sweet; Buck C. Hamlet; David L. Sweet, all of Fresno, Calif.

[73] Assignee: American Carrier Equipment, Inc., Fresno, Calif.

[21] Appl. No.: 145,442

[22] Filed: May 1, 1980

[51] Int. Cl.³ .............................................. B60P 1/36
[52] U.S. Cl. .................................... 414/519; 414/528
[58] Field of Search ............ 414/519, 528; 298/23 R, 298/23 M, 23 MD, 23 S; 198/728, 735

[56] References Cited

U.S. PATENT DOCUMENTS

| | | | |
|---|---|---|---|
| 3,272,552 | 9/1966 | Park | 298/23 MD X |
| 3,291,327 | 12/1966 | Simmons et al. | 414/528 |
| 3,937,338 | 2/1976 | Cox | 414/528 |
| 4,068,769 | 1/1978 | Sweet et al. | 414/528 X |
| 4,253,791 | 3/1981 | Drie | 414/528 |

FOREIGN PATENT DOCUMENTS

| | | | |
|---|---|---|---|
| 907953 | 10/1962 | United Kingdom | 414/519 |
| 1141930 | 2/1969 | United Kingdom | 414/528 |

*Primary Examiner*—James L. Rowland
*Attorney, Agent, or Firm*—Huebner & Worrel

[57] ABSTRACT

A wheel-supported, fluid-tight, top filling, rear discharge cargo box having a door pivotally supported in suspension for closing the rear discharge opening, a hydraulically actuated latching mechanism for controlling the operation of the door and a drag chain totally confined within the cargo box characterized by a pair of horizontally spaced, endless chain members disposed in horizontally spaced vertical planes and a discontinuous series of drag bars extended between the lower runs of the chain members for the drag chain defining a load receiving opening between the opposite ends of the series for facilitating a top-loading of the cargo box.

5 Claims, 11 Drawing Figures

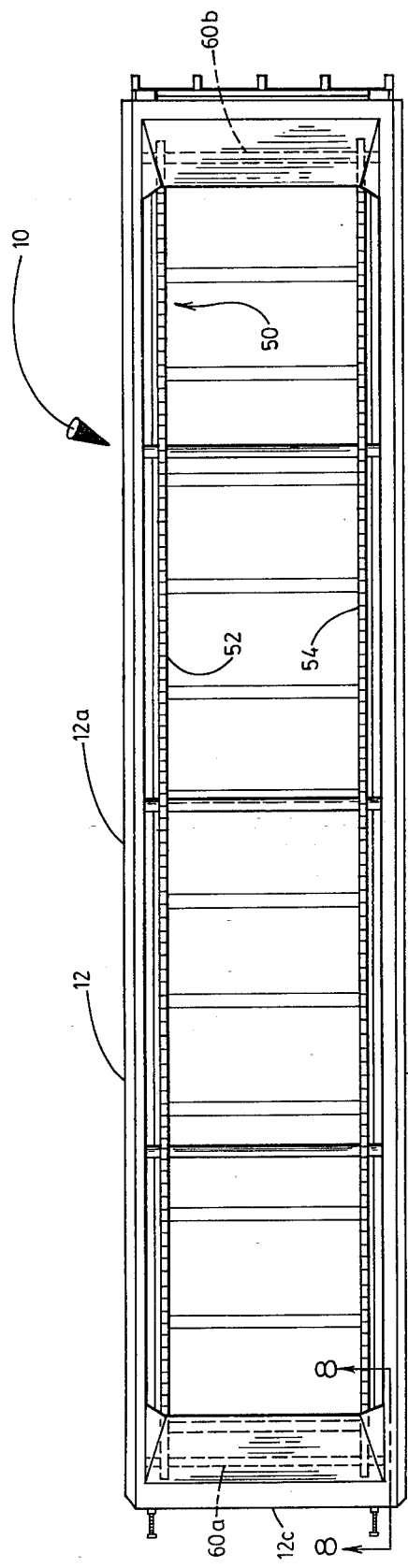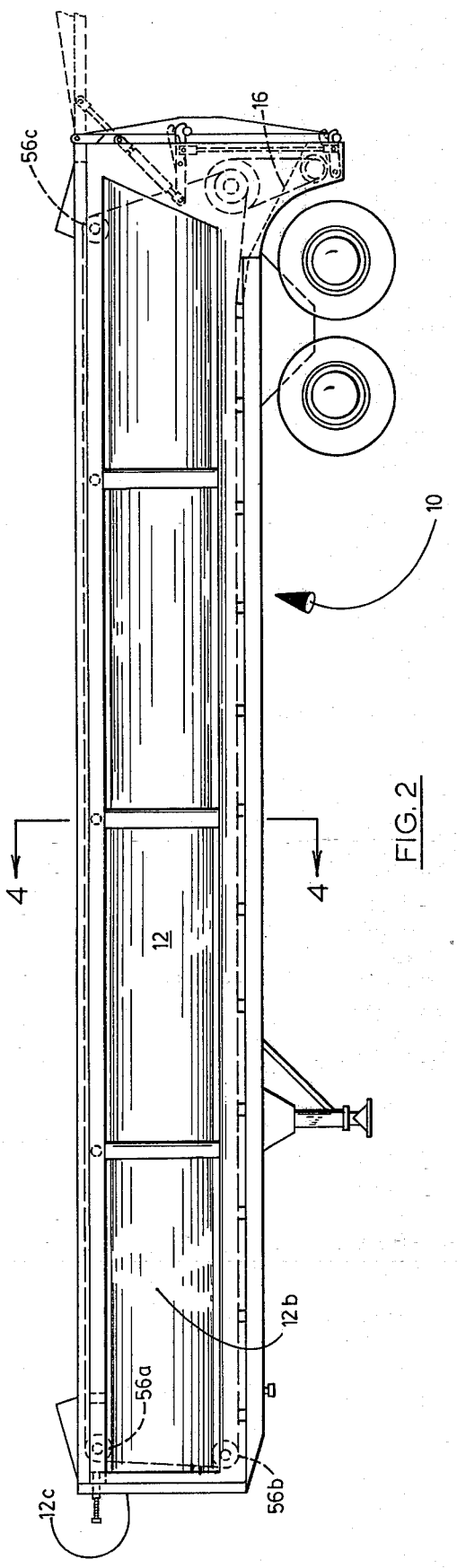

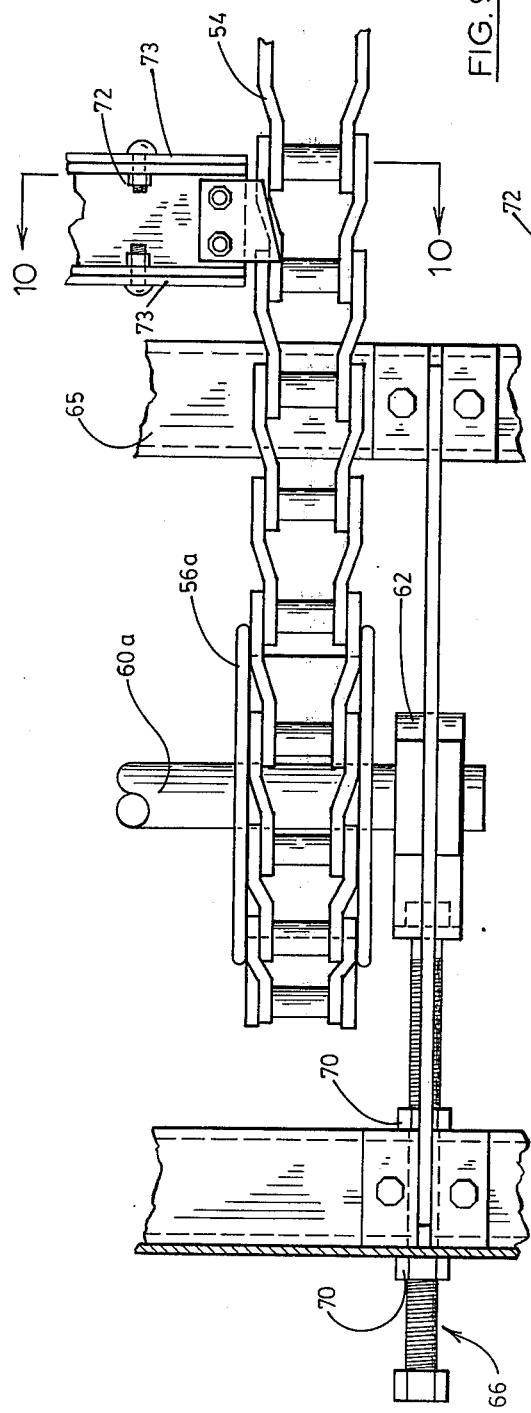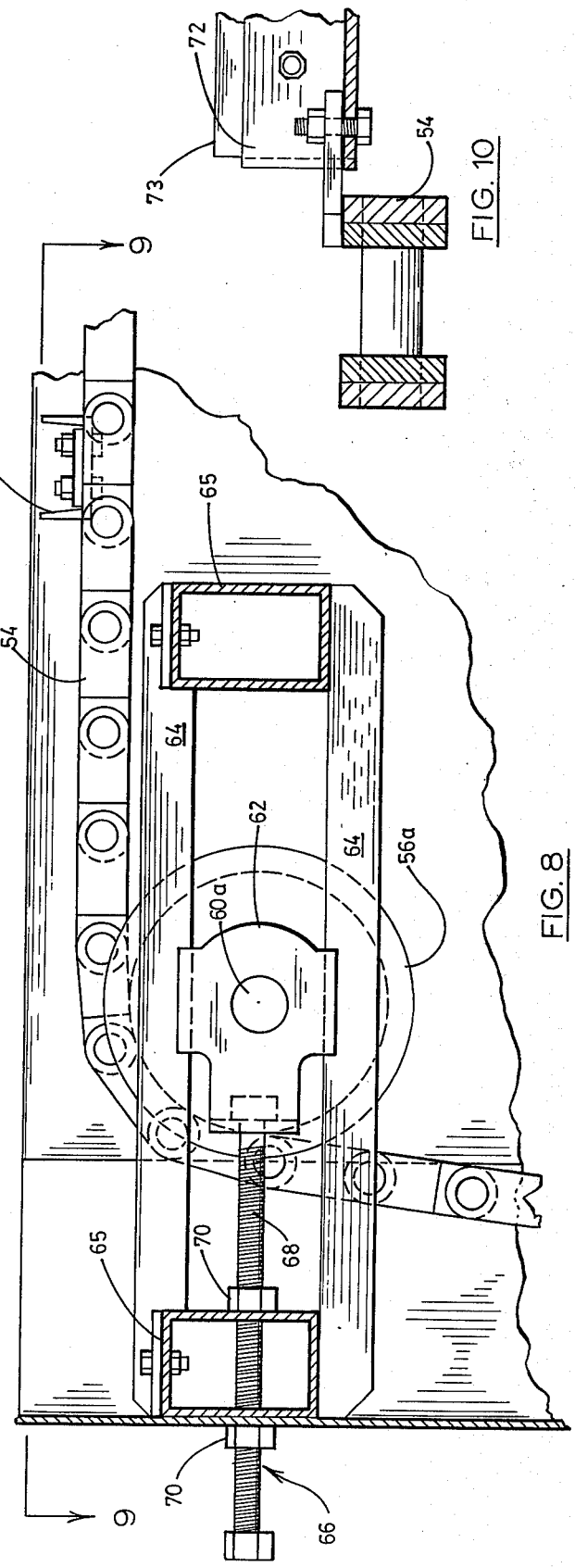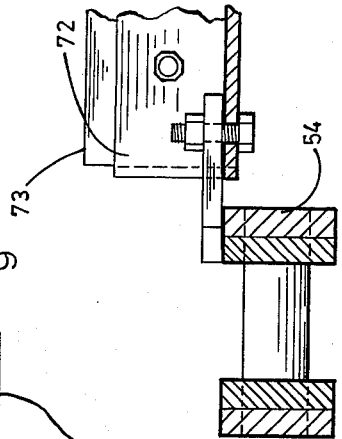

MOBILE TRANSPORT FOR FLUID CARGO

BACKGROUND OF THE INVENTION

1. Field of the Invention

The invention generally relates to mobile transport devices and more particularly to a trailer particularly suited for transporting fluid cargo and the like.

2. Description of the Prior Art

Heretofore, it has been common practice to transport effluence, such as sludge and the like, utilizing so-called tank trucks and/or end-dump vehicles. As can be readily appreciated by those familiar with the use and operation of tank trucks and/or trailers, loading and unloading operations often are considered to, at best, constitute laborious, time-consuming operations.

Further, as can be appreciated by those familiar with the operation and use of end-dump vehicles having a capability for their cargo boxes tilting rearwardly in order to discharge the contents thereof, the inherent lack of stability, particularly when the cargo comprises sludge, and the power requirements thereof often impair the desirability and utility of such vehicles.

Consequently, there currently exists a need for a practical mobile transport for use in transporting fluid cargo, such as sludge and the like.

It is therefore the general purpose of the instant invention to provide an improved, high-capacity, mobile transport characterized by rapid loading and unloading capabilities, particularly suited for use in transporting a fluid cargo, such as sludge and the like.

OBJECTS AND SUMMARY OF THE INVENTION

It is an object of the instant invention to provide an improved, mobile transport for fluid cargo.

It is another object to provide in a mobile transport for fluid cargo, a fluid-tight cargo box having a drag chain disposed totally within the confines thereof adapted to be employed in assisting in discharging contents from the box.

It is another object to provide a vehicular trailer for use in transporting effluence characterized by an open-top, rear-discharge cargo box having disposed therewithin a drag chain so configured as to include a loading opening defined between the ends of a discontinuous series of drag bars, and a suspension door, the operation of which is controlled through the use of a pair of floating hydraulic cylinders.

These and other objects and advantages are achieved through the use of a mobile transport, such as a vehicular trailer, having a fluid-tight cargo box characterized by a substantially open-top, and a rear discharge opening, and an endless drag chain disposed totally within the box comprising a pair of horizontally-spaced, endless chains interconnected by a discontinuous series of transversely oriented drag bars, and a pair of floating hydraulic cylinders for controlling the operation of the door for the rear discharge opening, as will become more readily apparent by reference to the following description and claims in light of the accompanying drawings.

DESCRIPTION OF THE DRAWINGS

FIG. 2 is a side elevational view of the transport shown in FIG. 1, depicting alternate positions for the door thereof.

FIG. 3 is a top plan view of the transport.

FIG. 8 is a vertically sectioned view taken generally along lines 8—8 of FIG. 3, also on an enlarged scale.

FIG. 9 is a fragmented, top plan view taken generally along lines 9—9 of FIG. 8.

FIG. 10 is a vertically sectioned view taken generally along lines 10—10 of FIG. 9.

DESCRIPTION OF THE PREFERRED EMBODIMENT

Figure 1:
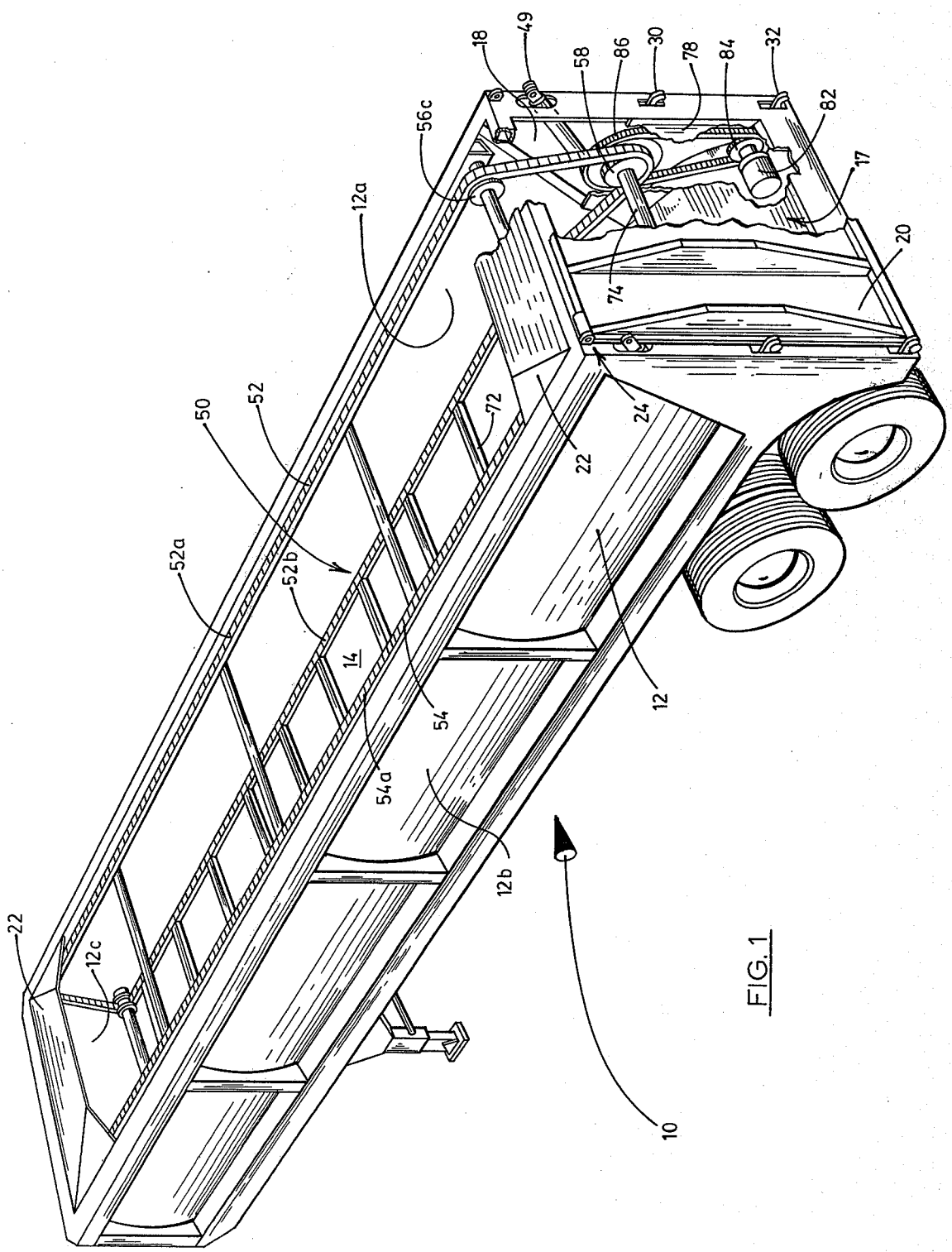
FIG. 1 is a fragmented, perspective view of a mobile transport embodying the principles of the instant invention.
Figure 4:
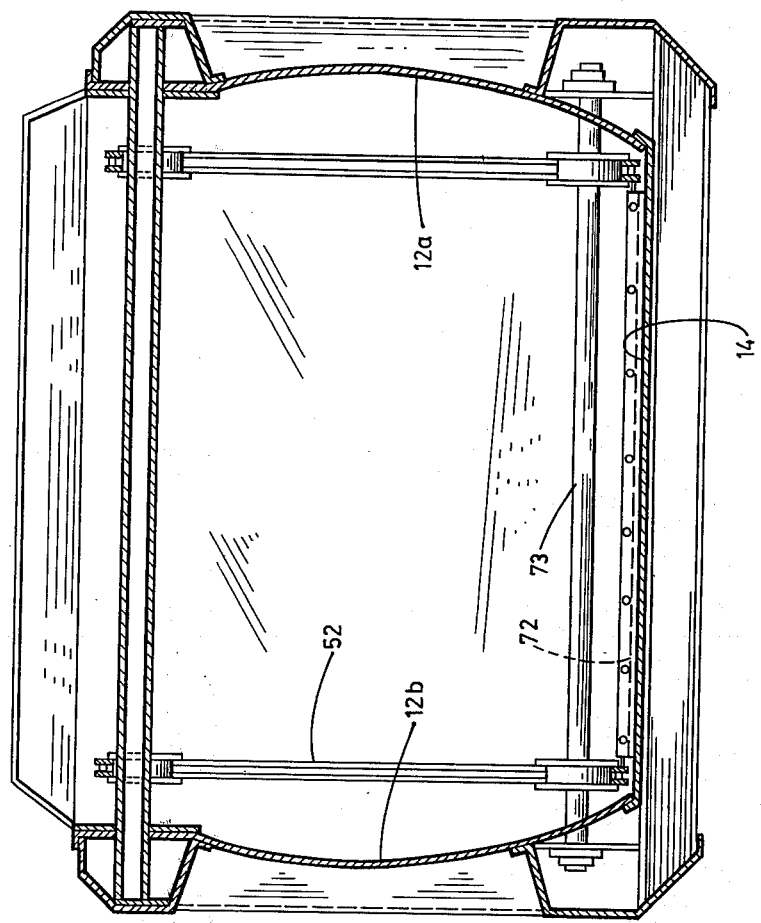
FIG. 4 is a vertically sectioned view taken generally along lines 4—4 of FIG. 2.
Figure 5:
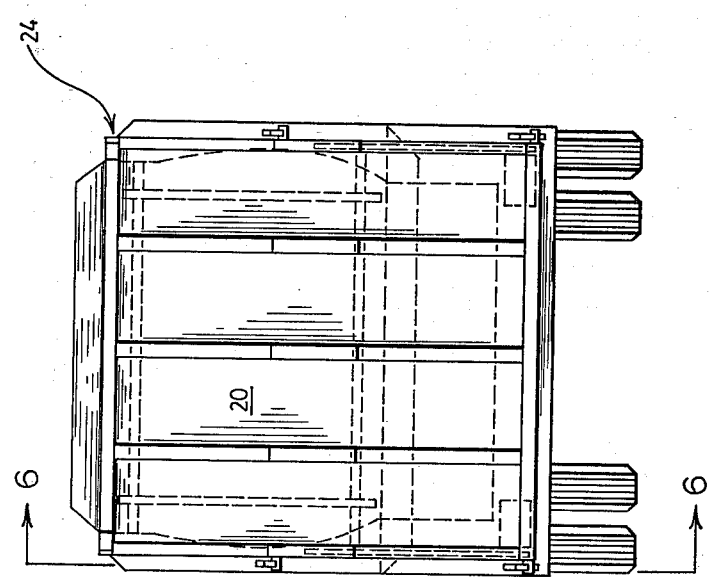
FIG. 5 is a rear view of the transport.

Referring now to the drawings, with more particularity, wherein like reference characters designate like or corresponding parts throughout the several views, there is shown in FIG. 1 a mobile transport, generally designated 10. The transport 10 also is herein, for the sake of simplicity, frequently referred to as a trailer. However, it is to be understood that while the transport 10 is depicted and referred to as a trailer, the principles of the instant invention may be embodied in the bed of a trunk, or similar vehicle equally as well.

As shown in FIG. 1, the trailer 10 is fabricated utilizing a conventional trailer frame and suspension system, the details of which form no part of the invention herein claimed. Hence, a detailed description thereof is omitted.

It is important to note that the trailer 10 includes a fluid-tight cargo box having elongated, opposed side walls 12a and 12b and a front wall segment, designated 12c. The box further includes a transversely or horizontally oriented floor 14 having a downwardly inclined segment 16 which defines the floor of a rear discharge chute 17. This chute terminates in an opening, designated 18, for the cargo box. The purpose of the downwardly inclined segment 16 for the chute, will hereinafter become more readily apparent. For the present, it suffices to understand that the chute accommodates a gravitational discharge of contents from the box 12 through the discharge opening 18.

As shown in the drawings, the opening 18 is closed by a pivotally supported door 20, hereinafter to be more fully described. Additionally, it is to be understood that while a cover may be employed, the cargo box 12 preferably is an open-top box having splash guards 22 disposed at each of its opposite ends for purposes of precluding "slop over" as the trailer is accelerated and/or decelerated during its operation. Moreover, it is to be understood that while the trailer 10, as shown, preferably is of all-welded steel construction, the techniques and materials employed are dictated by various factors, such as economy, weights, types and sizes of loads to be transported.

As best shown in FIG. 1, the door 20 is supported in suspension by a horizontally oriented clevis coupling 24 mounted at each of the opposite sides thereof. The particular design of the clevis coupling employed is varied as desired. For example, where so desired, the door is suspended by a hinge including a plurality of coaxially aligned barrels, not designated, alternately connected to the door and the frame of the cargo box and having received therein a transversely oriented hinge pin, also not designated.

Additionally, it is preferred that the door 20 be provided with a gasket 28 interposed between the surfaces of the door and the cargo box, in circumscribing relation with the discharge opening 18, for thereby establishing a fluid-tight seal in response to a closing and securing of the door 20 relative to the discharge opening 18.

In order to secure the door 20, relative to the discharge opening 18, there is provided at each of the opposite sides of the discharge opening, a cam-lock mechanism which includes an upper camming hook 30 and a lower camming hook 32 interconnected through a suitable push-pull link, designated 34. It is important to note that affixed to and projected horizontally from the door 20, in a position to be captured by the camming hook 30, there is an upper pin 36, while a lower pin 38 similarly is projected from the door 20 in a position to be captured by the camming hook 32. Moreover, each of the camming hooks 30 and 32 is supported for pivotal displacement in a vertical plane by a suitable pin-and-bracket mounting, generally designated 40. Since the details of the pin-and-bracket mountings 40 form no part of the claimed invention, a detailed description thereof also is omitted in the interest of brevity. It here suffices to understand that both of the camming hooks are of elongated configurations, and that the camming hook 30 is supported by its pin-and-bracket mounting near its center portion whereby there is provided an extended lever arm 42, FIG. 6. The arm 42, for each of the camming hooks 30, located at each of the opposite sides of the door 20 is connected with a floating hydraulic slave cylinder 44, only one of which is hereinafter described.

Figures 6, 7:
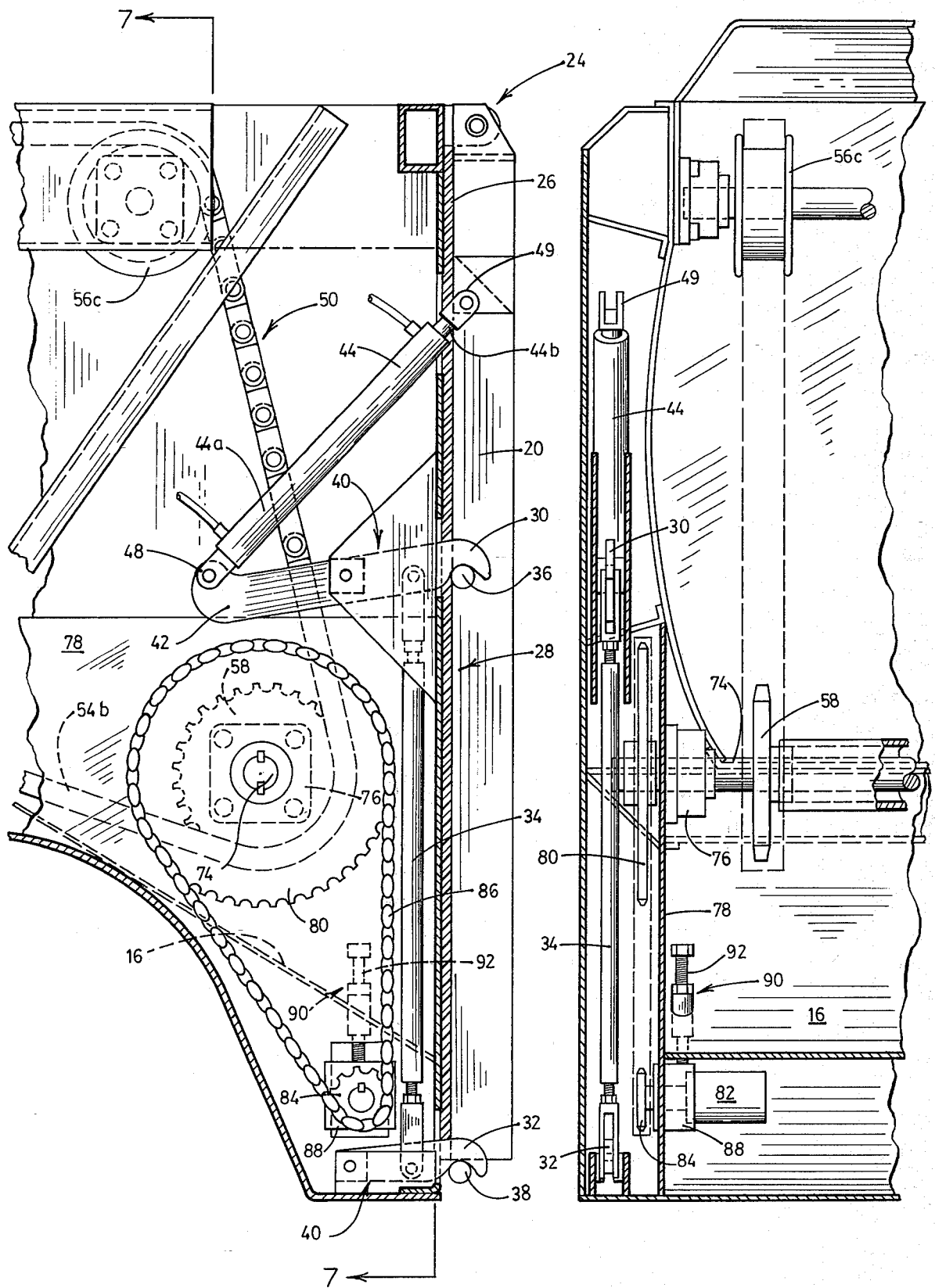
FIG. 6 is a fragmented, vertically sectioned view taken generally along lines 6—6 of FIG. 5, but on a somewhat enlarged scale.
FIG. 7 is a vertically sectioned view taken generally along lines 7—7 of FIG. 6.

The cylinder 44 includes a barrel 44a, FIG. 6, and a piston shaft 44b. The barrel 44a of the slave cylinder 44 is pivotally connected through the suitable clevis 48 to the projected end portion of the actuating arm 42. The extended end portion of the shaft 44b is connected through a suitable clevis 49 to a door 20. It is important here to appreciate that the slave cylinder 44 preferably comprises a hydraulic, double acting cylinder. However, due to the floating characteristics of the cylinder, the barrel 44a, when pressurized in a manner normally relied upon for effecting an extension of the shaft 44b, initially moves downwardly for purposes of upwardly pivotally displacing the camming hook 30. Of course, once the limit of travel for the camming hook is reached, the barrel 44a is no longer free to travel relative to the shaft 44b, whereupon the motion of the barrel is arrested.

Pivotal displacement of the camming hook 30 necessarily causes concurrent pivotal displacement to be imparted to the camming hook 32, because of the motion transferring effect of the link 34. Thus the door 20 is released for pivotal displacement. Once the barrel 44a is no longer free to travel, continued pressurization of cylinder 44 causes the shaft 44b to extend axially relative to the barrel 44a. Axial extension of the shaft 44b now imparts pivotal displacement to the door 20, subsequent to its having been released for causing the door to pivot upwardly about the axis established by its clevis coupling 24. Thus the door is pivotally displaced away from the discharge opening for purposes of accommodating a discharge of the contents from the cargo box 12 via the discharge opening 18.

It should, at this juncture, be appreciated that fluid cargo, such as sludge and the like, often includes substantial quantities of solids which collect as sediment, not readily discharged in response to an opening of the door 20. Consequently, the cargo box 12 is provided with a drag chain, generally designated 50, the purpose of which is to assure a rapid and complete unloading of the cargo box. The drag chain 50 is totally confined within the cargo box 12, FIG. 1, in order to assure that a fluid-tight integrity is maintained. This chain is supported for displacement from a load-receiving position and a load-discharge position, as will hereinafter become more readily apparent.

As best illustrated in FIGS. 1 and 3, the drag chain 50 includes a pair of horizontally spaced, endless chains, designated 52 and 54. The chain 52 includes an upper run 52a and a lower run 52b, FIG. 1, while the chain 54 includes an upper run 54a, also FIG. 1, and a lower run 54b, FIG. 6. Each of the chains 52 and 54 is supported by at least 3 idlers, designated 56a, 56b, and 56c, FIG. 2, and a driven sprocket wheel 58, FIG. 6.

As shown in the drawings, the idlers 56a–56c comprise simple sheaves, each of which is supported for free rotation. Preferably, the idlers are supported by axles 60a and 60b, FIG. 3, supported for free rotation.

As best shown in FIGS. 8 and 9, the axle 60a is supported by a pair of horizontally adjustable bearing blocks 62, each of which is, in turn, supported by parallel rails 64 mounted on transverse beams 65 for the cargo box 12, near the forward end thereof. A chain tightener 66 is provided for tensioning the chains 52 and 54, simply by displacing the bearing blocks 62 in fore and aft directions. As a practical matter, a tightener 66 is provided for each of the blocks 62 and includes a screw-threaded shaft 68 extended through the forwardmost beam 65 and a pair of nuts 70, FIG. 8. The nuts are disposed at opposite sides of the beam, and are connected to the beam as by welding or the like. Each of the shafts 66 is connected to a bearing block 62 through a threaded position 68, terminating in a bearing coupling, of suitable design, which accommodates torque induced rotation of the screw-threaded shaft 66. Consequently, through the application of torque to the shafts 66, the shafts are extended, or retracted, relative to the nuts 70, for purposes of imparting translation to the blocks 62, whereupon a change in the tension of the chains 52 and 54 is achieved.

Extended transversely between the lower runs 52b and 54b of the chains 52 and 54, there is a discontinuous series of slat-like drag bars 72, FIG. 1. These bars, in turn, include wipers 73 which perform a wiping function as they traverse the floor of the cargo box.

It is also important to note that when the drag chain 50 is in its load-receiving position, none of the drag bars appear across the load-receiving open top of the cargo box 12. Consequently, a load of sludge readily can be introduced through the top of the cargo box without experiencing any obstructing or impeding effects of drag bars. Consequently, the drag chain 50 may be considered to include a load-receiving opening defined between the opposite ends of the discontinuous series of drag bars 72.

In order to advance the drag chain 50 in a uniform manner, the sprocket wheels 58 are rigidly affixed to a common drive shaft 74. The drive shaft 74, in turn, is supported at each of its opposite ends of a bearing block 76 mounted on a vertically oriented plate 78 forming a side wall of the chute 17. In practice, the plate 78 is of suitable strength and is welded in place to form a rigid bracket for supporting the bearing block 76. It also is noted that the drive shaft 74 extends through the plates 78 with the opposite end portions thereof serving to receive a pair of chain-driving sprocket wheels, designated 80. As a practical matter, the sprocket wheels 58 and 80 are connected to the shaft 74 in any suitable manner, including a use of suitable keys, such as keys 82 seated in key-ways, as shown in FIG. 6. In any event, it is to be understood that the sprocket wheels 58 and 80 are rigidly affixed to the shaft 74 and that the shaft 74 is supported for rotation by the bearing blocks 76, whereby rotation imparted to the gears 80 serves to impart driving rotation to the sprocket wheels 58, for purposes of advancing the drag chain 50.

Driven rotation is, in turn, imparted to the sprocket wheel 80 through the use of a pair of hydraulic motors, designated 82. These motors comprise high-torque, low-speed rotary motors sold under the trademark CHAR-LYNN by the EATON Corporation of Eaton Prairie, Minn.

Each of the motors 82 has affixed to its output shaft a sprocket wheel 84, FIG. 6, about which is trained an endless chain 86. Each of the chains 86 also is trained about one of the sprocket wheels 80, whereby as rotary motion is imparted to the sprocket wheel 84 torque is applied to the shaft 74, via the chains 86 and sprocket wheels 80.

Figure 11:
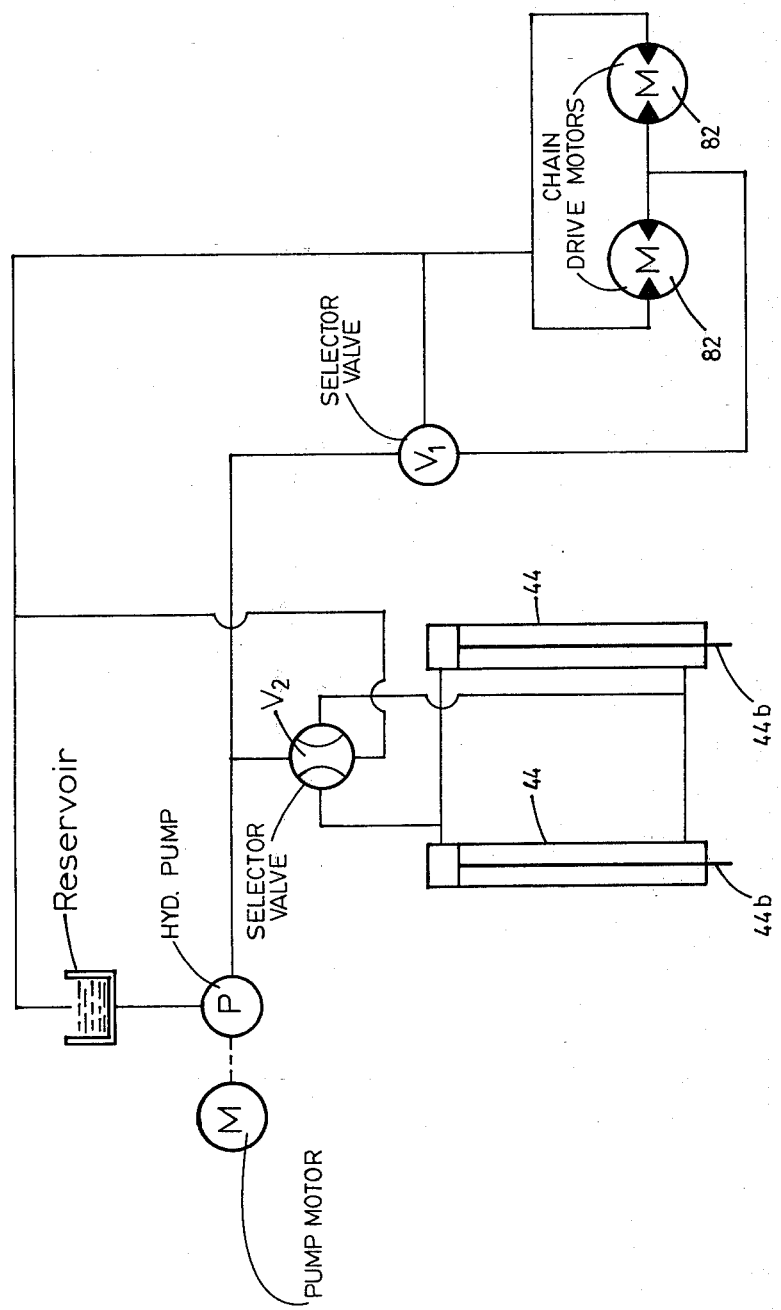
FIG. 11 is a schematic view depicting a hydraulic system for the transport shown in FIGS. 1-10.

As a practical matter, the motors 82 are interconnected for simultaneous operation, preferably illustrated in FIG. 11. Additionally, each of the motors is mounted employing a suitable block 88 supported by a chain tightener 90. The chain tightener 90 is similar in design and construction to the chain tightener 66 in that the chain tightener 90 includes a screw-threaded shaft 92 extended through the floor of the chute 17 into a coupled relation with the mounting block 88. Hence, each of the blocks 88 is supported to be displaced in vertical directions for purposes of varying the tension in the chains 86. Such displacement is effected through application of torque to the shaft 92.

With particular reference now to FIG. 11, wherein is illustrated a suitable hydraulic system, it is noted that as shown the system includes a pump P driven by a motor M. The pump P is connected to the motors through a first selector valve $V_1$ and to the slave cylinders 44 through a second selector valve $V_2$. A reservoir R is provided for supplying hydraulic fluid to the system in a conventional manner.

It should now be apparent that through a manipulation of the valves $V_1$ and $V_2$, provided the motor M is operative, the motors 82 and the slave cylinder 44 may be actuated simultaneously. Since hydraulic systems are well-known and the details of the system form no part of the claimed invention, a more detailed description of the hydraulic system employed is omitted in the interest of brevity.

OPERATION

It is believed that in view of the foregoing description, the operation of the invention herein disclosed and claimed readily is apparent. However, in the interest of completeness, the operation of the disclosed invention is at this point briefly reviewed.

With the cargo box 12 assembled in the manner hereinbefore described, the drag chain 50 initially is advanced to its load-receiving disposition, viz. a position wherein the opposite ends of the series of drag bars 72 define an upwardly facing, load-receiving opening. This displacement of the drag chain 50 is achieved through a selected manipulation of the valve $V_1$ which causes the motors 82 to be driven in rotation, simultaneously, for purposes of driving the sprocket wheels 80 simultaneously to impart translatory motion to the chains 52 and 54, and hence the series of drag bars 72.

The selector valve $V_2$ next is actuated for purposes of assuring that the weight of the door 20, along with the thus induced retraction of the shafts 44b assures that the door 20 seats relative to the discharge opening 18. Once the door is fully seated, displacement of the shaft 44b is terminated whereupon the barrel 44a of the slave cylinder 44 assumes motion relative to the shaft 44b. In response to the thus assumed motion of the barrel 44a, in a direction such as to telescopically receive the shaft 44b, pivotal displacement is imparted to the actuating arm 42, whereupon the camming hooks 30 and 32 are driven into a camming and capturing relationship with the pins 36 and 38, for thus securing the door 20 in place. In practice, the camming hooks 30 and 32 perform a camming function, as the hooks capture the pins. Thus the cargo box 12 is ready to receive a load of fluid, such as sludge, to be introduced through the open top thereof. Upon receiving the fluid cargo, the trailer is towed employing a conventional tractor or similar vehicle to a point of discharge.

At the point of discharge, the valve $V_2$ again is manipulated in a direction such as to extend the shafts 44b of the slave cylinders 44. However, because the shafts 44b cannot be moved against the door 20, in its previously secured position, the barrel 44a is caused to undergo displacement relative to the shaft 44b. Such displacement of the barrel 44a imparts pivotal motion to the arm 42 of the camming hooks 30 and 32, whereupon the camming hooks are elevated, relative to the pins 36 and 38, for thus releasing the door 20. Once the camming hooks 30 and 32 reach the full extent of their throw the pins 36 and 38 are released. The door 20 is now free to be pivotally displaced through an extension of the shafts 44b. Of course, once the arms 42 are seated, the shafts 44b begin to extend relative to the barrel 44a. This extension of the shafts pivotally displaces the door 20 to its elevated, load-discharge position, best illustrated in FIG. 2.

The valve $V_1$ now is selectively actuated for energizing the hydraulic motors 82, concurrently. Upon the motors 82 concurrently being energized, in response to a manipulation of the valve $V_1$, the sprocket wheels 84 drive the sprocket wheels 80, via the chain 86 for thus causing the sprocket wheels 58 to be driven in rotation. As the sprocket wheels 58 thus are driven in rotation the drag chain 50 is advanced toward its discharge position for thus causing the drag bars 72 to advance rearwardly toward the discharge opening 18. As the chain thus advances relative to the floor 14 of the cargo box 12, the wiper strips 73 slide along the surface of the floor for advancing sedimentary materials. Of course, as the sedimentary materials reach the chute 17, they are gravitationally discharged from the box 12, via the discharge opening 18.

Once the load has thus been discharged, the door 20 is again closed, the drag chain 50 repositioned to its initial or load-receiving position and the trailer 10 again prepared for further operations.

In view of the foregoing, it is believed to be readily apparent that the trailer 10 which embodies the principles of the instant invention provides a practical solution to the problems heretofore plaguing those engaged in the design and manufacture of mobile transports for fluid cargos and the like.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a mobile transport for fluidized cargo, the improvement comprising:
    A. an elongated cargo box, characterized by a forward and a rear end, comprising a substantially horizontally oriented floor extended between a forward and a rear terminous and a substantially vertically oriented wall including a pair of side wall segments and a forward end wall segment, means defining between said side wall segments, a rear discharge opening arranged in a substantially vertical plane passing through the rear terminous of said floor;
    B. means for establishing for said box a fluid-tight integrity for fluidized cargo including a door adjacently related to said opening and pivotally supported for angular displacement into a sealing relationship with said opening, whereby leakage of the cargo through said opening is avoided when said door is displaced into a sealing relationship with said opening; and
    C. an endless drag chain totally confined within said box and substantially extended between said forward end wall segment and the door when said door is displaced into a sealing relationship with the discharge opening including a lower run supported in scraping engagement with the upper surface of said floor and an upper run supported in vertically spaced relation with the lower run of the drag chain.

2. An improvement as defined in claim 1 wherein said floor includes an inclined ramp segment adjacently related to said discharge opening for enhancing gravitational discharge of fluid cargo from said box.

3. An improvement as defined in claim 1 wherein said drag chain includes a pair of endless sprocket-driven chain members arranged in horizontally spaced relation, and a plurality of drag bars extended in uniform, mutually spaced parallelism interconnecting the chain members.

4. An improvement as defined in claim 3 wherein each drag bar is provided with an elongated wiper extended to engage the upper surface of said floor.

5. An improvement as defined in claim 3 wherein said box further comprises means defining a filling opening oppositely related to said floor and said drag chain is moveable from a loading position to an unloading position for completing a discharge of fluid cargo from said box, said drag chain being further characterized by drag bars disposed only along the lower run thereof when the drag is in its loading position.

* * * * *